Feb. 22, 1955  D. Z. ERLE  2,702,455
POWER BOOSTED MASTER BRAKE CYLINDER
Filed April 13, 1953
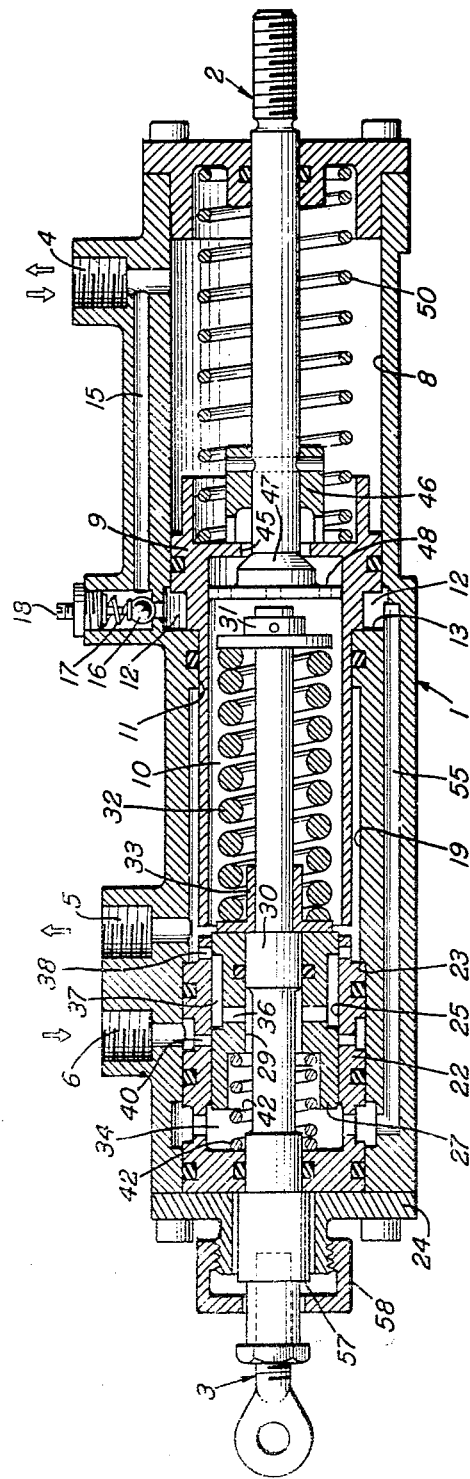
INVENTOR.
D. Z. ERLE
BY
ATTORNEY 2,702,455
                    Patented Feb. 22, 1955

2,702,455

POWER BOOSTED MASTER BRAKE CYLINDER

Donald Zaner Erle, Van Nuys, Calif., assignor to Bendix Aviation Corporation, North Hollywood, Calif., a corporation of Delaware Application April 13, 1953, Serial No. 348,226

6 Claims. (Cl. 60—54.6)

This invention relates broadly to the control element of a hydraulic brake system, which control element may be: (1) a master cylinder actuated by human force; (2) a valve for controlling delivery of pressure fluid from a power source; or (3) a master cylinder actuated in part by human force and in part by pressure boost from a power source. More specifically, the invention relates to a power boosted master cylinder structure that is also adaptable to function as a power brake valve.

An object of the invention is to provide a simple and practicable power boosted master brake cylinder.

Another object is to provide a combination power brake valve and power boosted master cylinder that, by variably proportioning the parts, can be made to function either (1) initially as a power brake valve and thereafter as a master cylinder to develop a higher braking pressure, or, (2) initially as a master cylinder and thereafter as a power brake valve to develop a higher brake pressure.

Other more specific objects and features of the invention and a thorough understanding thereof may be had from the detailed description to follow with reference to the drawing.

The single figure of the drawing is a longitudinal section through a power boosted master cylinder and power brake valve in accordance with the invention.

Referring to the drawing, there is shown a body 1 having an actuating rod 2 extending from the right end thereof and an anchor rod 3 extending from the rear end thereof. For convenience the right end will hereinafter be referred to as the front end. The anchor rod 3 may be connected to any suitable anchor point so that it is held against movement. The actuating rod 2 is adapted to be connected through any desired form of linkage to a manually operable member, which may be a pedal or a handle. The body 1 is provided with a brake port 4 adapted to be connected to a brake line, a return port 5 adapted to be connected to the return line of a pump or the like, and a pressure port 6 adapted to be connected to the pressure line of the pump.

The body 1 defines in the forward end thereof a master cylinder 8 which is connected adjacent its right end to the brake port 4 and contains, reciprocable therein, a master piston 9. Projecting rearwardly from the master piston 9 is a hollow plunger 10 which extends through, in sliding sealing relation with, an aperture 11 in the rear end wall of the cylinder 8. The body defines a boost chamber 12 between the rear end wall 13 of the cylinder 8 and the piston 9, which chamber expands in response to forward movement of the piston 9 and plunger 10 and contracts in response to opposite movement thereof.

Although it is not necessary for all of the uses of the structure, a bypass passage 15 may be provided between the boost chamber 12 and the brake port 4. This bypass passage contains a check valve 16 for preventing return flow from the brake port to the boost chamber. The ball 16 may be urged against its seat by a spring 17. A screw 18 may be provided for positively locking the ball 16 against its seat to permanently block flow through the passage 15.

The rear portion of the body 1 defines an elongated chamber 19 into which the plunger 10 extends and which contains a stationary valve element 22. As shown, the latter is retained in position against a shoulder 23 formed in the chamber 19, by an end cap 24. The stationary valve element 22 is provided with a cylindrical bore 25 sealing with the external surface of a reciprocable or movable valve member 27. The anchor rod 3 extends through the left end of the stationary valve element 22 in sealing relation therewith, and through a bore 29 provided therefor in the movable valve element 27. The rod 3 has a land 30 thereon which seals with the bore 29. The anchor rod 3 has a reduced portion extending forwardly a substantial distance beyond the movable valve element 27 and has a spring retainer 31 on its forward end. A stiff helical compression spring 32 is compressed between the retainer 31 and a retainer 33 which is positioned against the front end of the movable valve element 27.

The stationary and movable elements of the valve, together with the anchor rod 3, define a reaction chamber 34 at the rear end of the movable valve element 27. Pressure in this reaction chamber 34 opposes rearward movement of the movable valve element 27. The reaction chamber 34 is connected by passages 36 to an annular recess 37 in the exterior surface of the movable valve element 27. In the normal, forward position of the movable valve element 27 this recess 37 registers with a return passage 38 in the stationary valve member, which return passage is in constant communication with the return port 5. When the movable valve element 27 is moved rearwardly with respect to the stationary valve member 22, as by forward movement of the body 1 relative to the anchor rod 3, the recess 37 is disconnected from the return passage 38 and is connected to a pressure passage 40 which is in constant communication with the pressure port 6. A helical compression spring 42 compressed between the rear end wall of the stationary valve member 22 and the rear end of the movable valve element 27 normally maintains the movable element in the forward position shown.

In the normal position of the device the master cylinder 8 is communicated, through a valve seat 45 in the master piston 9 and through the hollow plunger 10, with the chamber 19 which is in constant communication with the return port 5. Rearward movement of the actuating rod 2 with respect to the piston 9 is limited by a stop member 46 on the actuating rod which abuts against the piston 9. When the actuating rod 2 is advanced, that is, moved to the right, a poppet 47 thereon engages against the seat 45 and blocks communication between the master cylinder 8 and the return port 5. It also provides mechanical connection so that continued forward movement of the actuating rod 2 moves the piston 9 with it. The rear end of the actuating rod may be provided with a guide plate 48 which is slidable within the hollow plunger 10 and contains apertures as shown in dotted lines for the free passage of fluid therethrough.

The device described is capable of use as a power boosted master cylinder without operation as a power brake valve. Under these conditions the passage 15 is blocked by turning the screw 18 in until it clamps the ball check 16 tightly against its seat.

To apply the brakes, the actuating rod 2 is moved to the right. This movement is effective first to close the poppet 47 against the seat 45 and thereafter urge the piston 9 forward, to displace fluid through the brake port 4. Forward movement of the rod 2 relative to the body 1 is opposed by the pressure reaction on the piston 9 and also by a helical compression spring 50 which is compressed between the front end of the cylinder 8 and the front end of the piston 9. It is to be noted that the body 1 is not supported against longitudinal movement but is in floating relation between the actuating rod 2 and the anchor rod 3. Whether or not the rod 2 moves out of the body or the body moves forward on the anchor rod 3 will depend on the relative resistances to movement of those two elements. Movement of the rod 2 is opposed by the force of the spring 50 and the reactive pressure of fluid in the cylinder 8 on the piston 9. Forward movement of the body 1 relative to the anchor rod 3 is opposed by the spring 42 and by the pressure force of fluid in the reaction chamber 34. In the normal position as shown, the reaction chamber 34 is connected to the return port, so that substantially the sole restoring force is that of the spring 42. This spring 42 is made stiffer than the spring 50 in the master cylinder, so that initial forward movement of the actuating rod 2 moves the actuating rod out of the front end of the body to advance the piston 9 and deliver fluid through the brake port 4.

A hydraulic brake system initially absorbs fluid with very little opposition while the brake shoes are moving out into contact with the drums, after which the reactive pressure increases rapidly. During the initial or filling period, therefore, the piston 9 continues to move and deliver fluid from the master cylinder 8 through the brake port 4 until the reaction force on the piston increases to a value greater than that required to overcome the reaction spring 42, whereupon the body 1 moves forward with the rod 2 relative to the anchor rod 3 and the movable valve element 27, to disconnect the reaction chamber 34 from the return port 5 and connect it to the pressure port 6. Immediately this happens, the reaction chamber 34 receives fluid from the pressure port 6 and delivers it through a passage 55 to the boost chamber 12 where it is effective against the differential area between the plunger 10 and the cylinder 8 to aid the actuating rod 2 in moving the piston 9 forwardly. The rise in the pressure in the reaction chamber 34 urges the movable valve element 27 forwardly, and when this force in conjunction with the force of the spring 42 exceeds the total force applied between the anchor rod 3 and the actuating rod 2 the movable valve element 27 will move back to close the pressure passage 40. Therefore, regardless of how high the pressure is in pressure port 6, the valve will function to maintain in the reaction chamber 34 and in the boost chamber 12 a pressure bearing a predetermined value with respect to the pull applied to the actuating rod 2.

Assuming that the available pressure in the pressure port 6 is very high as compared to the maximum pressure that is ever desired in the boost chamber 12, the extent of the boost obtained is determined by the relative areas of the rear face of the piston 9 exposed to the boost chamber and the rear face of the movable valve element 27 exposed to the pressure in the reaction chamber 34. For convenience, the rear area of the piston 9 exposed to fluid in the boost chamber will be referred to as the boost area, and the area of the rear end of the movable valve member 27 exposed to fluid in the reaction chamber 34 will be referred to as the reaction area. If the boost area is made large compared to the reaction area then the boost force obtained will be relatively large. Vice versa, if the reaction area is large relative to the boost area the assistance obtained by the boost will be relatively small.

As a safety measure, it is often desirable to definitely limit the maximum pressure that can exist in the reaction chamber 34 when the pressure of the source connected to the pressure port 6 is extremely high. Such protection is afforded by the pressure limiting spring 32. When the pressure in the reaction chamber 34 reaches a predetermined value further pull on the body 1 with respect to the anchor rod 3 will simply compress the spring 32 until a shoulder 57 on the anchor rod 3 engages a stop collar 58 on the left end of the body.

Assume now that the valve is to be used as a combination power valve and master cylinder. In this event the screw 18 is actuated to disengage the ball 16 so that the latter can function as a check valve to permit free flow of fluid from the boost chamber 12 to the brake port 4, but prevent reverse flow. It will be apparent that under these conditions whenever the pressure in the boost chamber 12 exceeds the pressure in the brake port 4 fluid can flow directly from the pressure port 6 through the reaction chamber 34, the passage 55, and the boost chamber 12 to the brake port 4, to fill the brake line independently of the movement of the piston 9.

The conditions under which the pressure in the boost chamber 12 can exceed the pressure in the brake port 4 depends on the relative proportioning of the valve parts. If the boost area is small relative to the effective area of the piston 9 then a small pressure against the front face of the piston 9 will counterbalance a higher pressure in the boost chamber 12 acting against the boost area of the piston, and the valve 16 will open to permit direct flow of fluid from the pressure port to the brake port 4 without appreciable forward movement of the piston 9. Therefore the filling of the brakes will be accomplished largely by the power fluid, and a relatively low pressure source of power fluid can be employed. The desired high maximum brake pressure can then be obtained by manual force applied to the actuating rod 2 after the pressure in the brake port 4 has risen to the pressure of the fluid in the pressure port 6. Since under these conditions the power source supplies a large volume of fluid at low pressure and the function of the master cylinder is to deliver a small volume of fluid at high pressure, the diameter of the master cylinder 8 and piston 9 would be small enough to enable the available force applied to the rod 2 to develop the maximum desired brake pressure.

If the diameter of the plunger 10 is reduced, the differential area or boost area of the piston exposed to fluid in the boost chamber 12 is increased until a point is reached where the forward force on the piston resulting from the pressure fluid in the boost chamber, combined with the pull applied to the rod 2, develops a pressure in the master cylinder 8 exceeding the boost pressure, and the ball check valve 16 will be held on its seat until the master piston 9 has completed its stroke and bottomed against the right end of the cylinder 8. Thereafter, further stress applied to the actuating rod 2 will move the body 1 forwardly with respect to the anchor rod 3 to actuate the valve mechanism to deliver fluid from the pressure port 6 through the boost chamber 12 and past the check valve 16 to the brake port 4.

Summarizing the operation of the device, let:

$F_1$ represent the force of the piston spring 50.
$F_2$ represent the force of the valve spring 42.
$F_3$ represent the manual or pedal pull applied to rod 2.
$P_1$ represent the boost pressure in reaction chamber 34 and boost chamber 12.
$P_2$ represent the brake pressure in brake port 4.
$A_1$ represent the area of master piston 9.
$A_2$ represent the area of the boost piston; i. e., the differential area between the master piston 9 and plunger 10.
$A_3$ represent the area of valve 27.

It will be observed that the valve 27 is urged in opening direction by the force $F_3$ and in closing direction by the boost pressure $P_1$ and the spring force $F_2$. Therefore, $$F_3 = P_1 A_3 + F_2 \qquad (1)$$

The master piston 9 is urged to the right by the pedal force $F_3$ and the boost pressure $P_1$, and to the left by the brake pressure $P_2$ and the spring force $F_1$. Therefore, $$F_3 + P_1 A_2 = P_2 A_1 + F_1$$

and $$P_2 = \frac{F_3 + P_1 A_2 - F_1}{A_1} \qquad (2)$$

In a typical application of the invention to obtain a brake pressure $P_2$ of 300 p. s. i. with a pedal force $F_3$ of 350 pounds without power, the following values may be used:

$A_1 = 1.117$ sq. in.
$A_2 = .380$ sq. in.
$A_3 = .442$ sq. in.
$F_1 = 15$ pounds
$F_2 = 27$ pounds Substituting the given values for $F_3$, $A_3$ and $F_2$ in Equation 1, the boost pressure $P_1$ will be found to be 730 p. s. i.

Substituting the given values in Equation 2, the brake pressure $P_2$ will be found to be 548 p. s. i., with a pedal force $F_3$ of 350 pounds, using the device only as a pressure-boosted master cylinder; i. e., with the check valve 16 locked shut.

If the check valve 16 is released for operation, the boost pressure $P_1$ will be substantially the same as the brake pressure $P_2$, the master piston 9 will not move, and the device will function solely as a power brake valve so long as the pressure supplied to the pressure port 6 exceeds the desired brake pressure $P_2$. Whenever the pressure supplied to port 6 drops below the brake pressure $P_2$, the device will again function as a pressure-boosted (by whatever pressure exists in port 6) master cylinder.

Now let it be assumed that the dimensions of the device are changed as follows:

$A_3$ from .442 to .646 sq. in.
$A_2$ from .380 to .554 sq. in.

The increase in $A_3$ reduces the boost pressure (under a pedal force $F_3$ of 350 pounds) from 730 p. s. i. to 500 p. s. i., but the increase in $A_2$ makes the lower boost pressure effective to develop (in conjunction with the pedal force $F_3$ of 350 pounds) the same brake pressure $P_2$ of 548 p. s. i. as before. Since the boost pressure is now less than the brake pressure, the check valve 16 does not open unless and until the master piston 9 bottoms, after which the device functions as a power brake valve to deliver pressure fluid past the check valve to the brake port.

It is therefore apparent that if the boost piston area and the valve area are large enough relative to the brake piston area, the boost pressure will be less than the brake pressure as long as the piston is free to move, and the master piston will bottom before the check valve 16 opens to permit power valve operation. On the other hand, if the boost piston area and valve area are made small enough relative to the brake piston area, the boost pressure will be greater than the brake pressure, and the primary operation will be as a power valve, and the secondary operation will be as a master piston, in the event of power failure.

Although for the purpose of explaining the invention a particular embodiment thereof has been shown and described, obvious modifications will occur to a person skilled in the art, and I do not desire to be limited to the exact details shown and described.

I claim:

1. A device of the type described comprising: a body having front and rear ends and defining therewithin a cylinder adjacent the front end thereof; a piston reciprocable in said cylinder; an actuating rod extending from said piston through the front end of said body in sealing relation therewith, and means on said actuating rod for moving said piston in response to reciprocatory movement of said rod; a plunger of smaller area than the piston secured to and extending rearwardly therefrom, said cylinder having a rear end wall sealing with said plunger and defining with the plunger and piston a boost chamber; an anchor rod extending from within said body through the rear end thereof in sealing relation therewith; said body containing a brake port connected to the front end of said cylinder, a pressure port, and a return port; boost valve means in said body rearward of said cylinder comprising a valve element fixed to said body and a longitudinally movable valve element in sealing relation with the fixed element and means coupling said movable element to said anchor rod for movement therewith; means defining with said valve elements a reaction chamber at the rear end of said movable valve element, and passage means connecting it to said boost chamber, whereby pressure in said reaction chamber opposes rearward movement of said movable element and said anchor rod; a valve spring urging said movable valve element into a forward limit position, said valve elements having cooperating ports therein for connecting said chambers to said return port in said forward limit position and transferring connection of said chambers from said return port to said pressure port in response to predetermined rearward movement of said movable element; said body being freely movable longitudinally whereby forward movement of said actuating rod can either move said piston forward in said cylinder to discharge fluid therefrom into said brake port or move said body and fixed valve element forward with respect to said movable valve element and anchor rod to admit pressure fluid from said pressure port to said reaction chamber and boost chamber, depending upon the resistance to motion of said piston in said cylinder relative to the resistance to motion of said movable valve element into said reaction chamber.

2. A device according to claim 1 including means defining a bypass passage connecting said boost chamber to said brake port, and a check valve for preventing return flow from said brake port through said bypass passage.

3. A device according to claim 2 in which said means connecting said movable valve element to said anchor rod includes a pressure-limiting spring for permitting forward movement of the movable valve element relative to said anchor rod in response to predetermined pressure in said reaction chamber.

4. A device according to claim 1 including passage means connecting said return port to the cylinder on the front side of said piston, and means responsive to forward movement of said piston by said actuating rod for blocking said passage.

5. A device according to claim 4 in which said passage means includes a passage extending longitudinally through said piston and plunger and defining a valve seat; and said means for blocking said passage and said means on said actuating rod for moving said piston comprise a poppet on said actuating rod engageable with said seat.

6. A device according to claim 5 in which said anchor rod extends forwardly through said movable valve element in slidable sealing relation thereto and into said passage in said plunger and has a spring seat at its forward end, and said means connecting said movable element of said valve to said anchor rod comprises a pressure limiting helical spring concentrically disposed about said rod and compressed between said valve element and said spring seat.

References Cited in the file of this patent

UNITED STATES PATENTS

| | | |
|---|---|---|
| 2,524,012 | Groebe | Sept. 26, 1950 |
| 2,662,377 | Miller | Dec. 15, 1953 |